United States Patent [19]

Kramer, Jr. et al.

[11] 4,257,016
[45] Mar. 17, 1981

[54] PIEZO-OPTIC, TOTAL INTERNAL REFLECTION MODULATOR

[75] Inventors: Charles J. Kramer, Jr., Pittsford; Ned J. Seachman, Penfield, both of N.Y.

[73] Assignee: Xerox Corporation, Stamford, Conn.

[21] Appl. No.: 13,709

[22] Filed: Feb. 21, 1979

[51] Int. Cl.³ .......................... H01S 3/10; G02F 1/33
[52] U.S. Cl. ............................ 332/7.51; 350/162 R; 350/358
[58] Field of Search ........... 332/7.51; 350/6.5, 162 R, 350/358, 96.13

[56] References Cited

U.S. PATENT DOCUMENTS

| | | | |
|---|---|---|---|
| 3,617,931 | 11/1971 | Pinnow | 350/162 |
| 3,731,231 | 5/1973 | Torquet | 332/7.51 |
| 3,736,045 | 5/1973 | Heidrich et al. | 350/358 |
| 3,760,299 | 9/1973 | Vasile | 350/358 |
| 3,800,303 | 3/1974 | Picuendor et al. | 350/161 |
| 3,887,885 | 6/1975 | Hattori et al. | 332/7.51 |
| 3,931,595 | 1/1976 | Isaacs et al. | 332/7.51 |
| 3,938,881 | 2/1976 | Begelson et al. | 350/161 |
| 3,958,862 | 5/1976 | Rylski | 332/7.51 |
| 3,960,440 | 6/1976 | McNaney | 350/358 |
| 4,066,338 | 1/1978 | Hattori et al. | 350/161 |
| 4,184,738 | 1/1980 | Wright | 350/96.13 |

OTHER PUBLICATIONS

Kramer et al., "T.I.R. Acousto-Optic . . . Modulator," 5/76, 3 pp., Conf. on Laser and Electrooptical Systems, San Diego, Calif.
Shah, "Fast Acoustic . . . Modulator," 11/15/73, pp. 556-558, Appl. Phys. Lett., vol. 23, #10.
"SAW Modulated Lasers," 7/76, p. 7, Electronic Engineering, vol. 48, No. 581.
Kramer, "Elasto-Optic . . . Wave Properties," 1976, 265 pp., PHD Thesis, University of Rochester, No. 76-24,010.

Primary Examiner—Nelson Moskowitz

[57] ABSTRACT

A piezo-optical light modulator comprising an interaction medium and a transducer on one face of, and in optical isolation from, the interaction medium. Electrical signals are applied to create a periodic alternating strain field within the transducer. This field is transmitted into the interaction medium to create a shallow strain diffraction grating at a modulating surface. A light beam is projected so as to undergo a total internal reflection at this modulating surface, a portion of the light being selectively diffracted out of the incident beam.

10 Claims, 7 Drawing Figures

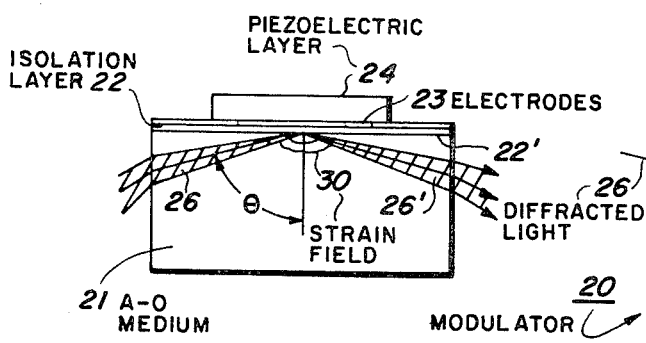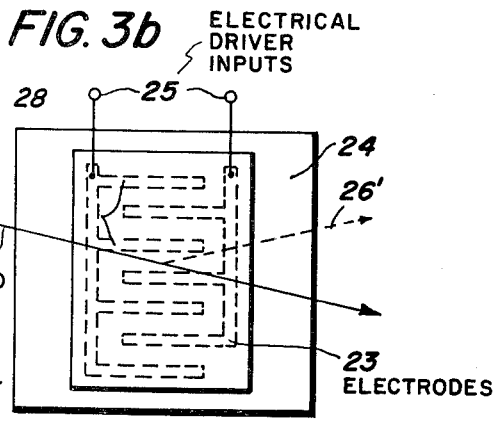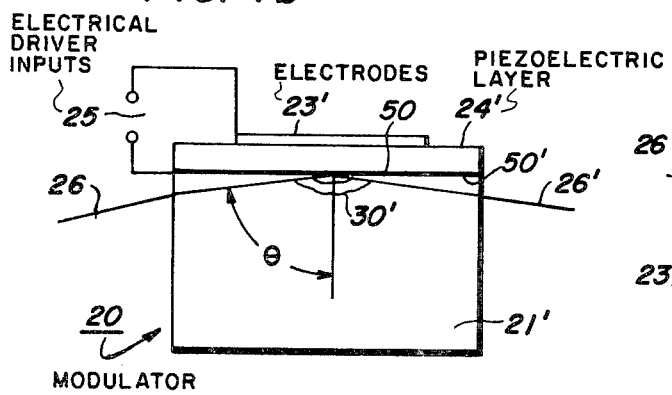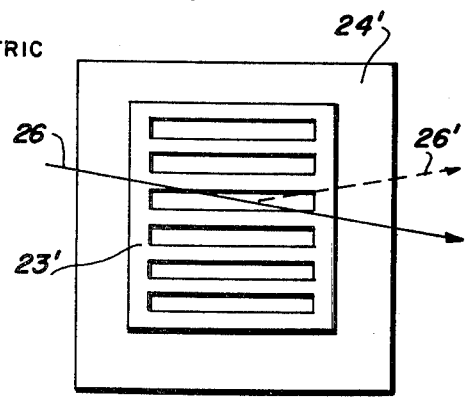

PIEZO-OPTIC, TOTAL INTERNAL REFLECTION MODULATOR

BACKGROUND AND PRIOR ART

The present invention relates to acousto-optical (A-O) modulators and, more particularly, to a piezo-optic (P-O) modulator in which light is totally internally reflected from a shallow phase grating created at a modulating surface.

The increasing use of lasers in a wide variety of high speed application (printers, communication devices, etc.) has resulted in a need for modulating the amplitude, phase, frequency and/or direction of the laser beam at megahertz to gigahertz frequencies. This need has been met, to some extent, by developing high quality optical materials whose properties can be altered by applying an electrical or magnetic field so as to produce an interaction with an optical wave projected through the material. Initial efforts were directed to electro-optic (E-O) light modulators which ultilized the principle that an electric field applied to a certain group of crystals would alter the refractive index of the crystal. This approach, while feasible, has two main drawbacks: the scope of suitable crystals materials is very limited and the crystals are prone to optical damage.

Acousto-optical devices, on the other hand, utilize the principle that the refractive index of a relatively broad range of materials can be modulated by generating an acoustic strain field within the material. This is generally accomplished by affixing a transducer to a surface of the modulator. The transducer then converts electrical signals into propagating acoustic waves which interact with optical waves at a volume of intersection within the material.

In contrast to E-O modulators, A-O devices can thus be any one of a broad range of materials chosen for their optical properties. They also would not generally be prone to the optical damage inherent in using the E-O crystals.

Prior art A-O modulators, typified by the embodiments shown in U.S. Pat. Nos. 3,731,231; 3,800,303; 3,617,931 and 3,938,881, are not suitable for amplitude modulation of light at rates of 100 MHZ and above. The restrictions on the modulation rates achievable in these prior art devices derive from the physical nature of the propagating strain fields created within the interaction medium. These fields are propagated sequentially into the medium so as to establish an acoustic diffraction grating at a desired location. To maximize modulation rates, the acoustic wave and the optical wave must both be precisely focused so that a small interaction length is obtained. The rise time of the diffracted light is equal to the time required to establish the grating across the width of the light beam. Since rise time is a function of the transducer bandwidth and the width of the interaction cross-section of the light with the acoustic wave, this finite time interval imposes a modulation limit on these devices.

Since prior art A-O modulators utilize focused acoustic waves, additional disadvantages exist. The focusing elements are difficult to manufacture and to position; high acoustic power densities in the interaction region are also required.

Various other approaches have been examined to achieve higher A-O modulation rates. William Chang in U.S. Pat. No. 3,655,261, discloses a method of confining the light/sound interaction length within guided waves in thin film structures. Manhar L. Shah in an article published in the Applied Physics Letters Vol. 23, No. 10, November 1973, describes a fast acoustic diffraction type thin film optical waveguide modulator. This guided wave technology, while improving diffraction efficiency somewhat, is still subject to several problems. The optical wave must be coupled in and out of the guide, and the confinement of light to the thin film generally requires careful mode control of the incident light and creates high power density in the film.

Another approach has been to explore the effects of using the so-called total-internal-reflective (TIR) principle. Briefly stated, a light wave traveling in a bulk optical material is totally reflected from a modulating surface at a high angle of incidence. At the modulating surface, a shallow phase grating has previously been formed either electro or acousto-optically. E-O TIR modulators have been developed by Scibor-Ryliski and disclosed in Electronic Letters, Vol. 9, pp. 309–310 (1973) and Vol. 10, pp. 4–6 (1974). See also U.S. Pat. No. 4,066,338 by Hattori et al. In these modulators, light propagates in an electro-optic crystal and the phase grating is formed by attaching inter-digital electrodes at the modulating surface. While this approach is relatively inexpensive and is capable of very fast rise times, it suffers from two problems: crystal materials appropriate to this device are prone to optical damage; and light reflected from the modulating surface contains undesirable wavefront phase irregularities because of the presence of the inter-digital electrodes.

An A-O TIR structure has been developed by Kramer, Araghi and Das and described in a paper read before the 1976 IEEE/OSA CLEOS Conference. In this device, a Rayleigh acoustic wave is propagated sequentially along the surface of a bulk material forming a shallow phase grating at this modulating surface. The modulator is positioned so that the focused beam is totally internally reflected from the acoustic propagation surface. While this device provides greater efficiency than the A-O thin film devices previously described, optimum efficiency is limited by the finite Rayleigh wave propagation time. Hence, this device also has a relatively long rise time, hence, modulation limitations.

The present invention is distinguished over the prior art A-O devices in that the alternating regions of the strain field comprising the shallow strain diffraction grating propagate in parallel (rather than sequentially) across a light beam and are produced by an external stress (P-O effect) instead of an internal stress (A-O effect) associated with a propagating elastic wave. The light beam is directed so that it is totally internally reflected at, and interacts with, the strain diffraction grating. This configuration permits much higher modulation rates than previously thought possible. A further distinction over the prior art is the optical isolation of the transducer elements to prevent possible differential phase shifts from occurring if the light beam were reflected from those elements. The invention is, of course, distinguishable over the prior art E-O modulators in that the interaction medium is not of the limited class of crystals required for the E-O type modulator.

SUMMARY OF THE INVENTION

The primary object of the present invention is, therefore, to provide a P-O modulator of improved bandwidth and efficiency. According to the present invention, there is provided a P-O modulator comprising a bulk interaction medium supporting a transducer means on one surface thereof. Electrical means are applied to the transducer to create periodic alternating strain fields which are transmitted into the interaction medium thereby forming a shallow strain diffraction grating at a modulating surface. The transducer means is optically, but not acoustically, isolated from the bulk interaction medium by a thin isolation layer. Light beams are directed so as to be reflected at the modulating surface and after interacting with said grating, a portion of the light beam is diffracted (modulated) into side orders.

BRIEF DESCRIPTION OF THE DRAWINGS

FIG. 3a is a sectional side view of the modulator shown in FIG. 2, wherein the transducer includes an inter-digital electrode array;

FIG. 3b is a top view of the modulator shown in FIG. 2.

FIG. 4 is a schematic side view of another embodiment of the invention wherein the transducer includes a single phase electrode array;

FIG. 4b is a schematic top view of the embodiment of FIG. 4a;

DETAILED DESCRIPTION OF THE INVENTION

Figure 1:
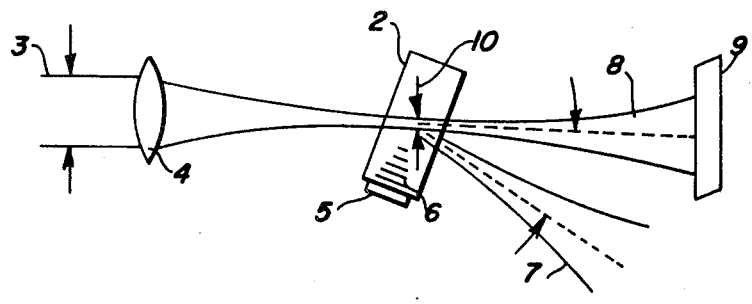
FIG. 1 is a schematic view of a prior art acousto-optic modulator.

In FIG. 1 there is shown a prior art A-O device which is comprised of an A-O medium 2 through which a beam 3 of light passes after being focused by lens 4. The beam 3 can be a narrow collimated light beam provided by a laser. A transducer 5 is bonded to the medium 2. The transducer converts electrical signals (applied from a source not shown) into propagating acoustic waves 6 which generate a volumetric phase grating in the modulation material. A fraction of the light incident on this grating at the Bragg angle is diffracted out of the incident beam (shown as beam 7 in FIG. 1) while the remainder of the undeflected beam 8 passes through the medium to be intercepted at beam stop 9. The light beam 3 is modulated in accordance with the characteristics of the electrical signal applied to the transducer.

It is apparent that the acoustic waves 6 are propagated sequentially into the medium, each wave taking a finite time to reach and cross the light beam to establish the acoustic diffraction grating. The rise time of the diffracted light is a function of the transducer's bandwidth and the width of the inter-action cross-section of the light with the acoustic wave. If the rise time is not transducer limited, it is given by the equation $$t_m \approx 1.7 (W_o/V) \quad (1)$$

where 2 $W_o$ is the diameter 10 of the optical waist at the 1/e amplitude points, assuming a Gaussian cross-section for the intensity, and V is the velocity of the acoustic wave. Equation 1 thus shows that the rise time is equal to the time required to establish the grating across the width of the light beam.

In order to achieve light pulses with a rise time of 10 nsec., the incident light beam must be focused so that its spot size in the inter-action region is on the order of $W_o = 40$ μm (assuming $V = 6 \times 10^5$ cm/sec.). For an isotropic modulation medium, the ratio of the diffracted light intensity to the incident light intensity is $$\frac{I_d}{I_i} = \Gamma^2 \frac{\sin^2\left[\left(\Gamma^2 + \frac{\Delta K^2}{4}\right)^{\frac{1}{2}} L\right]}{\left(\Gamma^2 + \frac{\Delta K^2}{4}\right)} \quad (2)$$

where $\Gamma^2 = \frac{\pi^2 n^6 P^2 |S|^2}{4\lambda}$ where n is the refractive index of the medium, P is the acousto-optic coefficient of the medium, S is the applied strain, λ is the vacuum wavelength of the incident light, L is the effective grating length and Δ K represents the momentum mis-match between the incident and diffracted light waves. Efficient operation of an A-O modulator is achieved when the divergency angle of the elastic wave matches that of the corresponding optical wave. Under these conditions Δ K in Equation 2 is essentially equal to zero.

Under optimum conditions, this type of a modulator can produce light pulses with a minimum rise time of 7 nsec. (equivalent to a modulation rate of 60 mhz). But to achieve even this rise time requires that the acoustic and optical waves be focused to a spot size of ≈80 μm and the spots must be made to exactly coincide. This places extraordinary requirements on the positioning of the optical beam within the modulator.

Figure 2:
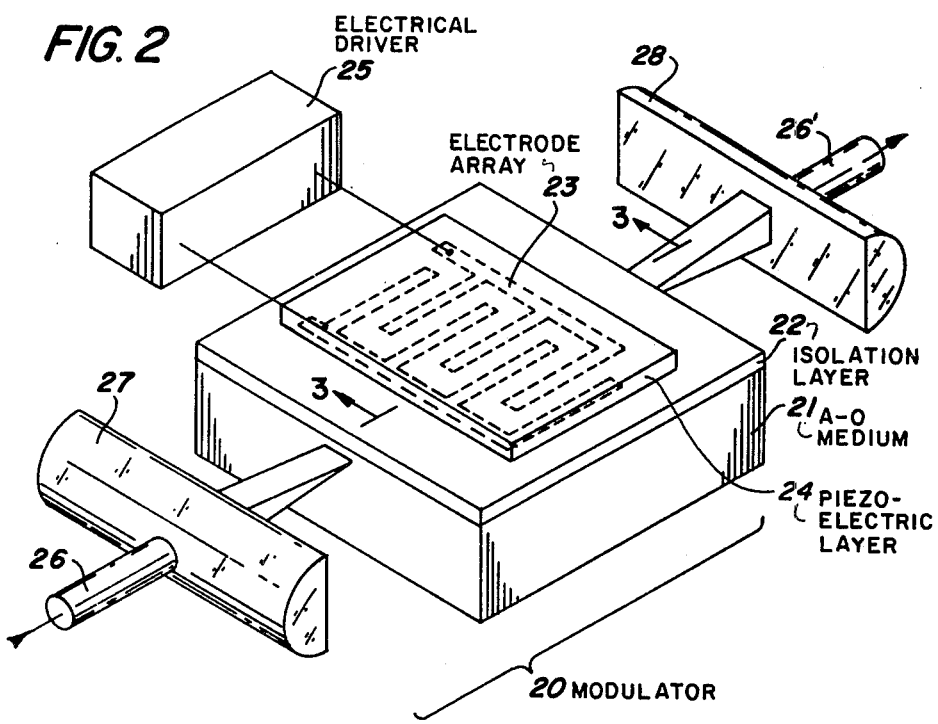
FIG. 2 is a representation of a modulation system using a preferred embodiment of the P-O TIR Modulator.

FIG. 2 illustrates a modulation system which includes a P-O TIR Modulator according to the invention. Referring to FIG. 2, modulator 20 comprises an A-O inter-action medium 21 having an isolation surface 22 bonded to its surface for purposes which will be later described more fully. An inter-digital electrode array 23 is bonded to the surface of layer 22 and a thin piezoelectric layer 24 completely overlies array 23. Electrical driver 25, connected to array 23 is adapted to develop a periodic alternating strain field in layer 24. (Unlike the driver required for the FIG. 1 modulator, the driver used in the present invention would not require a high frequency carrier signal). This field is transmitted through layer 22 into medium 21 to form a shallow strain field which acts as a diffraction grating. Collimated light beam 26 is focused by lens 27 so as to be totally reflected at a portion of the interface between layer 22 and interaction medium 21 lying within the strain field. The focused beam is diffracted into side orders as it interacts with the diffraction grating formed by the strain field after passing through modulator 20. The optical beam is collected and recollimated by lens 28. The different diffraction orders can then be spatially separated and appropriate detectors used with the selected orders.

FIG. 3a and 3b show a side cutaway view and a top view respectively of modulator 20. (The thickness of the layers has been exaggerated in order to more clearly illustrate the operating principles to be described below).

When driver 25 is energized, a periodic alternating strain field is developed in piezoelectric layer 24. The strain field is transmitted through fingers 29 of electrodes 23 through isolation layer 22 and into medium 21 for a very short distance. Shallow strain field 30

(greatly exaggerated) modifies the index of refraction of medium 21 by periodically altering the size and orientation of its index ellipsoid thereby establishing a plurality of diffraction grating periods, such grating having a period determined by fingers 28.

Light beam 26 is directed into medium 21 at an angle $\theta$ with respect to normal so as to focus and reflect a beam light at a portion of surface 22' of isolation layer 22 lying underneath the area bounded by finger pairs 28. The light beam interacts with field 30 and a portion of the light will be diffracted into side orders, one of which is represented by 26'.

The purpose of isolation layer 22 is at act as an optical barrier and prevent the optical field from interacting with layer 24 or array 23. If the directed light beam were not blocked, possible differential phase shifts could be caused by reflection from the electrodes or the piezoelectric material. To accomplish this purpose, the refractive index of the A-O medium 21 must be greater than that of layer 22.

It is important to note that, in the device shown in FIGS. 3a and 3b, the alternating regions of strain field 30 which comprise the diffraction grating propagate in parallel across the light beam. The significance of this propagation mode is that the incident light beam need only have a small dimension in the direction normal to the plane of layer 22. In the other dimension the beam can be very large without affecting either the rise time or diffraction efficiency of the modulator. Thus, if the incident light beam is brought to a line focus at surface 22', the optical beam waist can be much smaller than that required for prior art modulators. Equation (1) is valid for this device if $W_o$ is considered to the interaction depth below surface 22' rather than the optical beam waist. Since the energy interaction distance is smaller, the time constant will be relatively smaller compared to previous A-O devices. The time constant of array 23 can be further reduced by segmenting the array into separate element to further reduce capacitance. Since the interaction region is just below the electrodes, there is essentially no time delay between light diffraction and the application of electrical signal to the electrode. This device is also capable of maximum diffraction efficiency. Since the optical beam need be focused only in one direction and the strain field requires no focusing, it is fairly easy to optimally match the optical field to the strain field.

Turning now to a second embodiment of the invention shown in FIGS. 4a, 4b, the structure is seen to be similar to the embodiment shown in FIGS. 2 and 3 except that the isolation layer 22 is omitted. Instead, the electrode array is a single phase type having the base electrode 50 bonded to the surface of medium 21'. Piezoelectric layer 24' is bonded to base electrode 40 and electrode array 23' is formed on the outer surface of layer 24'. Base electrode 50 is an opaque metallic or other electrically conductive film, its bottom surface 50' highly reflecting to the incident optical wave. As such, it performs the same optical blocking function as the previously identified isolation layer and makes the isolation layer unnecessary. The device otherwise functions in the same manner as the previously described embodiment.

Referring again to FIG. 3, some typical values and materials for this device would be as follows. An incident angle $\theta$ of about 88° would provide the desired reflection. The focusing elements should provide a light spot of $2W_o = 16$ μm; if we assume an acoustic disturbance velocity of $4 \times 10^5$ cm/sec the device would have a rise time of 4 nsec and a bandwidth of 100 MHZ. Electrical driver 25 could be a wideband (200 MHZ) amplifier. The material used for the interaction medium should possess small optical absorption and scattering coefficients, large acousto-optic figures of merit and good mechanical as well as chemical stability. Since the propagation of an ultrasonic wave is not relevant to the present embodied device, the interaction medium does not have to possess small ultrasonic wave scattering and absorption coefficients. This enables a number of potential important candidates, such as plastics, to be used for the interaction medium. Polystyrene, as an example, has a very high figure of merit and is easily molded. Lead molybdate would be another acceptable medium. Piezoelectric layer 24 can be lithium niobate with a thickness greater than twice the thickness of electrode layer 23. The thickness of the electrode layer should be less than 1000 Å; evaporation techniques can be effectively employed to obtain this thickness. Isolation layer 22 thickness should be 1000 Å or more as described below. Magnesium fluoride is one example of a suitable isolation material. The exact thickness of layer 22 will be a function of factors such as indices of refraction of the interaction medium and isolation layer, the angle of beam incidence and light wavelength. These various relationships can be expressed by the following formulation:

$$E = E_o \exp(-\alpha y) \qquad (3)$$

where

E = amplitude of the light field in the isolation layer;
$E_o$ = the amplitude of the incident light field;
y = penetration depth of the optical field into the isolation layer and $$\alpha = \frac{2\pi n_2}{\lambda_o} \sqrt{\frac{\sin^2\theta}{(n_2/n_1)^2} - 1}$$

where $n_2$ is the isolation layer index, $n_1$ is the interaction medium index, $\lambda_o$ is the vacuum light wavelength and $\theta$ is the angle of the incident beam with respect to normal of the plane of the isolation layer.

Effective isolation of the electrode layer is achieved when the ratio of $E/E_o \leq 0.1$. The isolation layer thickness required to achieve this ratio is found by solving Eq. (3) for the y value which gives this ratio.

The electrode arrays, piezoelectric layer and the isolation layer (in FIGS. 3 and 4 embodiments) can all be deposited utilizing well known thin film techniques. A thin piezoelectric slab could also be bonded on top of the electrode array to form the piezoelectric layer.

Figure 5:
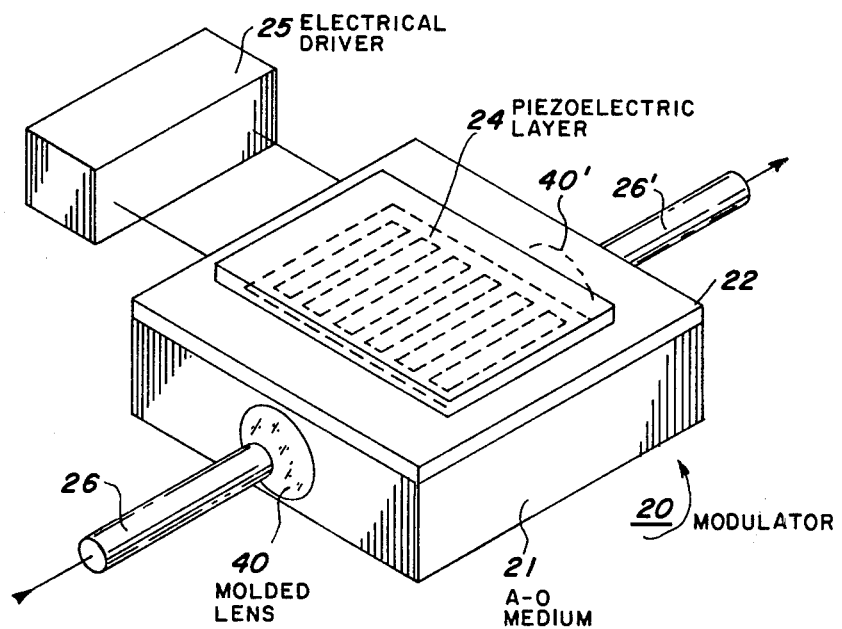
FIG. 5 is a modification to the system shown in FIG. 2, wherein the lenses are formed as part of the interaction medium.

As previously disclosed, a suitable material for the interaction material is polystyrene. This material has the added advantage that it is easily moldable and can be adapted to serve as the lens element in the system of FIG. 2. Referring to FIG. 5, it will be observed that separate lenses have been eliminated but molded lens 40, 40' have been formed as part of medium 21 to provide the desired focusing and collimating actions.

It is further noted that since the period of the strain diffraction grating is determined by the fixed period of the electrode structure the incident light beam direction does not have to be readjusted as the modulation frequency is changed. In the embodiments shown in FIGS.

2, 3, 4 and 5, the electrode period is symmetrical and therefore, a symmetrical phase shape is impressed on the diffracted light. Under these conditions, one would expect that only a maximum of ~33% of the incident light could be diffracted into any single side order. If the electrodes are arranged with an asymmetric period configuration, a blazed grating effect can be achieved with the result that almost all of the incident light can be diffracted into a single side order.

What is claimed is:

1. A piezo-optical modulator comprising:
   an acousto-optical interaction medium;
   a transducer means disposed above a surface of said interaction medium, said transducer means comprising a spatially periodic interdigital electrode array and further including a piezoelectric layer overlying said array,
   electrical driver means for developing in said piezoelectric layer a periodic alternating strain field which is propagated in parallel fashion into the interaction medium to form a shallow strain diffraction grating immediately adjacent said medium surface, and
   means for directing a light beam into said medium such that the beam is totally internally reflected at said surface and within said grating whereby a portion of said light beam is diffracted into at least one side order in accordance with the frequency of the alternating strain field.

2. The modulator as claimed in claim 1 further including an isolation layer of material disposed between said interaction medium and said transducer means and in intimate contact with both, said layer providing substantially complete light isolation between said medium and said transducer means.

3. The modulator as claimed in claim 2 wherein said interdigital array comprises at least two electrically isolated interdigital segments disposed on the surface of said isolation layer.

4. The modulator as claimed in claims 1 or 2 wherein said light beam directing means includes a lens for focusing said beam within said diffracting grating.

5. The modulator as claimed in claim 5 wherein said lens is formed as part of the interaction medium.

6. The modulator as claimed in claim 2 wherein the isolation layer has a thickness such that the ratio of the amplitude of the light field in the isolation layer to the amplitude of the incident light field is equal to or less than 0.1.

7. The modulator as claimed in claim 1 wherein said interaction material is a plastic.

8. The modulator of claim 3 wherein said electrodes are arranged such that their period is symmetrical whereby said light beam is diffracted into a plurality of side orders.

9. The modulator of claim 3 wherein said electrodes are arranged such that their period is asymmetrical whereby said light beam is diffracted into a single side order.

10. A piezo-optical modulator comprising:
    an acousto-optical interaction medium,
    a transducer means disposed above a surface of said interaction medium, said transducer means comprising a piezo-electric layer which overlies an electrically conductive reflective film and a single phase electrode formed on the surface of said piezo-electric layer, said film functioning as the base electrode for the array, as well as providing substantially complete light isolation between said medium and said piezoelectric layer,
    electrical driver means for developing in said transducer means a periodic alternating strain field, said transducer means transmitting said strain field into the interaction medium to form a shallow strain diffraction grating immediately adjacent said medium surface, and
    means for directing a light beam into said medium such that the beam is totally internally reflected at said surface and within said grating whereby a portion of said light beam is diffracted into at least one side order in accordance with the frequency of the alternating strain field.

* * * * *